United States Patent
Hsu et al.

(10) Patent No.: US 9,514,040 B2
(45) Date of Patent: Dec. 6, 2016

(54) MEMORY STORAGE DEVICE AND MEMORY CONTROLLER AND ACCESS METHOD THEREOF

(75) Inventors: Chia-Jung Hsu, Yilan County (TW); Shih-Hsien Hsu, Changhua County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 625 days.

(21) Appl. No.: 13/170,203

(22) Filed: Jun. 28, 2011

(65) Prior Publication Data

US 2012/0284473 A1 Nov. 8, 2012

(30) Foreign Application Priority Data

May 6, 2011 (TW) .............................. 100115929 A

(51) Int. Cl.
| | |
|---|---|
| *G06F 12/02* | (2006.01) |
| *G06F 12/14* | (2006.01) |
| *G06F 21/00* | (2013.01) |
| *G06F 21/55* | (2013.01) |
| *G06F 21/79* | (2013.01) |
| *G06F 21/85* | (2013.01) |

(52) U.S. Cl.
CPC ....... *G06F 12/0246* (2013.01); *G06F 12/1466* (2013.01); *G06F 21/00* (2013.01); *G06F 21/554* (2013.01); *G06F 21/79* (2013.01); *G06F 21/85* (2013.01); *G06F 2212/7201* (2013.01); *G06F 2221/2149* (2013.01); *G06F 2221/2153* (2013.01)

(58) Field of Classification Search
CPC ............. G06F 12/023; G06F 12/0246; G06F 3/0679; G06F 3/0644; G11C 16/102; G11B 20/00; G11B 20/00086; H04L 63/0428
USPC ............ 711/103, 164, 173; 726/26; 705/65; 713/1, 2, 100
See application file for complete search history.

(56) References Cited

U.S. PATENT DOCUMENTS

| | | | |
|---|---|---|---|
| 7,949,808 B2* | 5/2011 | Ho et al. .......................... | 710/72 |
| 2002/0016872 A1* | 2/2002 | Anzai et al. ..................... | 710/15 |
| 2003/0041160 A1* | 2/2003 | Sandman et al. .............. | 709/231 |
| 2003/0225971 A1* | 12/2003 | Oishi et al. .................... | 711/115 |
| 2005/0015540 A1* | 1/2005 | Tsai et al. ...................... | 711/103 |
| 2007/0112979 A1* | 5/2007 | Peng ................................ | 710/8 |
| 2010/0169510 A1* | 7/2010 | Ho et al. ......................... | 710/10 |
| 2010/0267259 A1* | 10/2010 | Sun .................. G06K 19/07732 439/131 |  |

FOREIGN PATENT DOCUMENTS

CN             1300711            2/2007

* cited by examiner

*Primary Examiner* — Reginald Bragdon
*Assistant Examiner* — Mehdi Namazi
(74) *Attorney, Agent, or Firm* — Jianq Chyun IP Office

(57) ABSTRACT

A memory storage device and a memory controller and an access method thereof are provided. The memory storage device includes a rewritable non-volatile memory chip having a plurality of physical blocks. The access method includes configuring a plurality of logical blocks to be mapped to a part of the physical blocks and dividing the logical blocks into at least a first partition and a second partition, wherein the first partition records an auto-execute file. The access method also includes determining whether a trigger signal is existent and sending a media ready message to a host system if the trigger signal is existent, so as to allow the host system to automatically run the auto-execute file and receive a first password. The access method further includes determining whether to provide the logical blocks in the second partition to the host system according to the first password received from the host system.

10 Claims, 7 Drawing Sheets

MEMORY STORAGE DEVICE AND MEMORY CONTROLLER AND ACCESS METHOD THEREOF

CROSS-REFERENCE TO RELATED APPLICATION

This application claims the priority benefit of Taiwan application serial no. 100115929, filed May 6, 2011. The entirety of the above-mentioned patent application is hereby incorporated by reference herein and made a part of this specification.

BACKGROUND

1. Technology Field

The present invention generally relates to a method of accessing a memory storage device, and more particularly, to a method of accessing a memory storage device by using a password, and the memory storage device and a memory controller using the same.

2. Description of Related Art

Flash memory has been broadly applied to various electronic products due to its many characteristics such as data non-volatility, low power consumption, small volume, and non-mechanical structure. In particular, flash memories are usually used as the storage media in portable storage devices (such as a flash drive) thanks to their small volumes and large storage capacities.

The design of portable storage devices has been going toward small volume and light weight in order to increase the portability thereof. However, a small-sized and light-weighted portable storage device may be lost easily and which may cause the data stored therein to be stolen. Thus, many data encryption and validation techniques have been developed to protect data stored in portable storage devices. For example, the technique which requires a user to input a password to access data has started to adopt multiple passwords and cross validation in order to enhance the security of the data.

Additionally, a portable storage device may also provide a password-protected auto-execute function regarding some operating platforms (for example, a Windows operating system). When a computer system detects the portable storage device, the computer system automatically runs this auto-execute function to require a user to input a password. However, if a user is in a relatively secure working environment (for example, the user uses his/her own computer), it is very inconvenient if the user has to input a password every time when he/she is about to use the portable storage device. Besides, a technique of protecting data with a password usually limits the number of password input attempts, and a portable storage device is locked if the number of invalid password input attempts exceeds a predetermined value. In this case, the user has to unlock the portable storage device by using a special software or by going to a service center set up by the manufacturer of the portable storage device, which is very troublesome and time-consuming.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to an access method of a memory storage device, a memory controller, and the memory storage device, wherein a user can conveniently access the password-protected memory storage device.

The present invention provides a method of accessing a memory storage device, wherein the memory storage device has a rewritable non-volatile memory chip, and the rewritable non-volatile memory chip has a plurality of physical blocks. The method includes configuring a plurality of logical blocks to be mapped to a part of the physical blocks and dividing the logical blocks into at least a first partition and a second partition, wherein the first partition records an auto-execute file. The method also includes determining whether a trigger signal is existent and sending a media ready message to a host system if the trigger signal is existent, so as to allow the host system to automatically run the auto-execute file and receive a first password. The method further includes determining whether to provide the logical blocks in the second partition to the host system according to the first password received from the host system.

The present invention provides a memory controller for managing a rewritable non-volatile memory chip in a memory storage device. The memory controller includes a host system interface, a memory interface, and a memory management circuit. The host system interface is configured to couple to a host system. The memory interface is configured to couple to the rewritable non-volatile memory chip, wherein the rewritable non-volatile memory chip has a plurality of physical blocks. The memory management circuit is coupled to the host system interface and the memory interface. The memory management circuit configures a plurality of logical blocks to be mapped to a part of the physical blocks and divides the logical blocks into at least a first partition and a second partition, wherein the first partition records an auto-execute file. The memory management circuit also determines whether a trigger signal is existent and sends a media ready message to the host system if the trigger signal is existent, so as to allow the host system to automatically run the auto-execute file and receive a first password. The memory management circuit further determines whether to provide the logical blocks in the second partition to the host system according to the first password received from the host system.

The present invention provides a memory storage device including a rewritable non-volatile memory chip, a connector, and a memory controller. The rewritable non-volatile memory chip has a plurality of physical blocks. The connector is configured to couple to a host system. The memory controller is coupled to the rewritable non-volatile memory chip and the connector. The memory controller configures a plurality of logical blocks to be mapped to a part of the physical blocks and divides the logical blocks into at least a first partition and a second partition, wherein the first partition records an auto-execute file. The memory controller also determines whether a trigger signal is existent and sends a media ready message to the host system if the trigger signal is existent, so as to allow the host system to automatically run the auto-execute file and receive a first password. The memory controller further determines whether to provide the logical blocks in the second partition to the host system according to the first password received from the host system.

The present invention provides a method of accessing a pluggable memory storage device, wherein the pluggable memory storage device has a storage area and is suitable for being coupled to a host system. In the present method, whether a trigger signal is existent is determined by the pluggable memory storage device, wherein the trigger signal is generated through the interaction between a portable object and the pluggable memory storage device. If the trigger signal is existent, a ready message is sent to the host system to allow the host system to use a first password. Whether to provide the storage area to the host system is determined by the pluggable memory storage device according to the first password received from the host system and at least one second password received from the pluggable memory storage device.

As described above, in the present invention, a host system is allowed to automatically run an auto-execute file in a memory storage device only when the memory storage device detects a trigger signal, so as to receive a password input by a user for determining whether the host system can access the memory storage device. Because the user can only input the password through the host system when the trigger signal exists, the security of data protected by the password is enhanced.

These and other exemplary embodiments, features, aspects, and advantages of the present invention will be described and become more apparent from the detailed description of exemplary embodiments when read in conjunction with accompanying drawings.

It should be understood, however, that this Summary may not contain all of the aspects and embodiments of the present invention, is not meant to be limiting or restrictive in any manner, and that the present invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF THE EMBODIMENTS

Figure 1A:
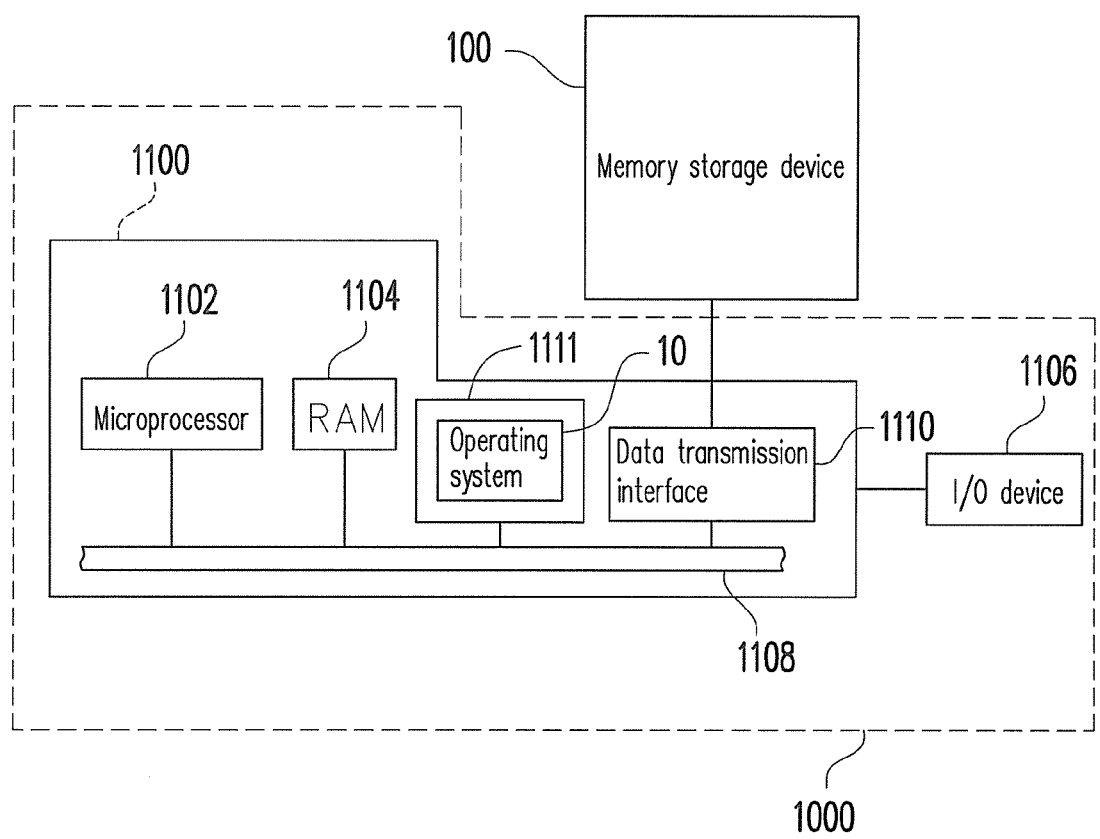
FIG. 1A is a diagram of a host system using a memory storage device according to an exemplary embodiment of the present invention.

Reference will now be made in detail to the present preferred embodiments of the present invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a memory storage device (also referred to as a memory storage system) includes a memory chip and a controller (also referred to as a control circuit). The memory storage device is usually used along with a host system so that host system can write data into or read data from the memory storage device. In addition, a memory storage device may also include an embedded memory and a software that is executed by the host system to be substantially served as a controller of the embedded memory.

FIG. 1A is a diagram of a host system using a memory storage device according to an exemplary embodiment of the present invention.

Figure 1B:
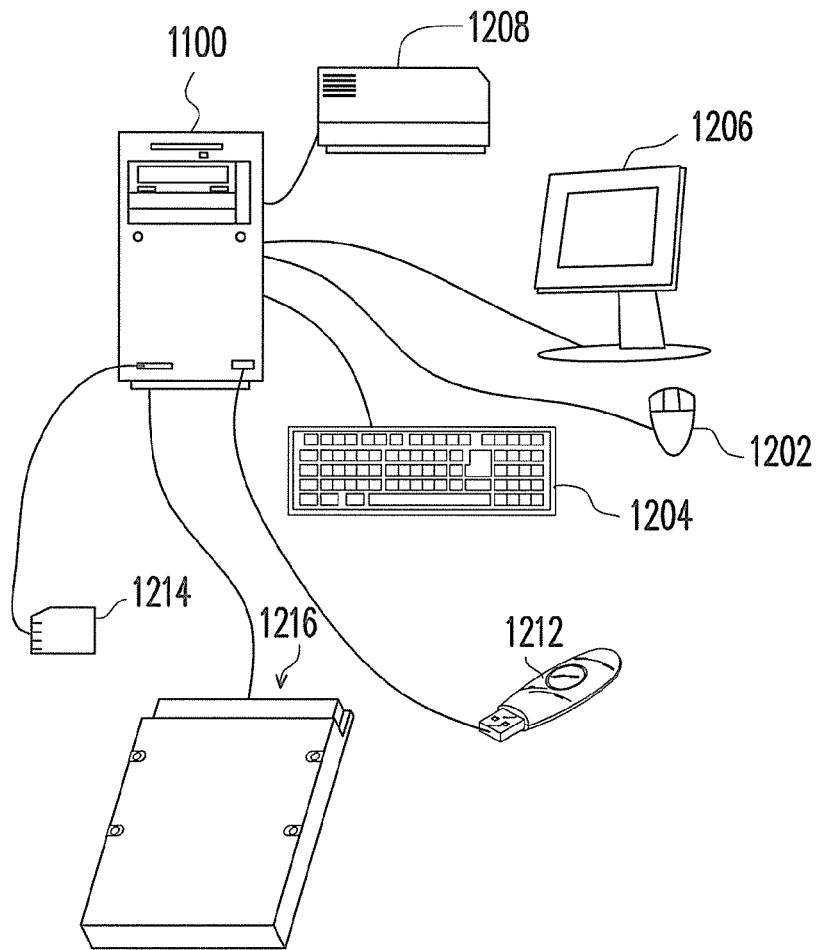
FIG. 1B is a diagram of a computer, an input/output (I/O) device, and a memory storage device according to an exemplary embodiment of the present invention.

The host system 1000 includes a computer 1100 and an input/output (I/O) device 1106. The computer 1100 includes a microprocessor 1102, a random access memory (RAM) 1104, a system bus 1108, a data transmission interface 1110, and a built-in storage device 1111. The I/O device 1106 includes a mouse 1202, a keyboard 1204, a display 1206, and a printer 1208, as shown in FIG. 1B. However, the I/O device 1106 is not limited to the devices illustrated in FIG. 1B and may further include other devices.

In an exemplary embodiment of the present invention, a memory storage device 100 is coupled to other components of the host system 1000 through the data transmission interface 1110. The memory storage device 100 may be a pluggable storage device. The host system 1000 can write data into or read data from the memory storage device 100 through operations of the microprocessor 1102, the RAM 1104, the I/O device 1106, and an operating system (OS) 10 installed in the built-in storage device 1111. The memory storage device 100 may be a memory card 1214, a flash drive 1212, or a solid state drive (SSD) 1216, as shown in FIG. 1B.

Figure 1C:
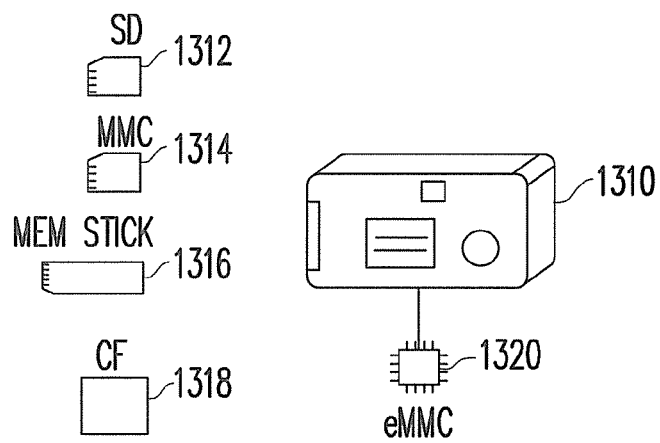
FIG. 1C is a diagram of a host system and a memory storage device according to another exemplary embodiment of the present invention.

Generally speaking, the host system 1000 may be any system that can store data. Even though the host system 1000 is described as a computer system in the present exemplary embodiment, in another exemplary embodiment of the present invention, the host system 1000 may also be a cell phone, a digital camera, a video camera, a communication device, an audio player, or a video player. For example, if the host system is a digital camera 1310, the memory storage device is then a secure digital (SD) card 1312, a multimedia card (MMC) card 1314, a memory stick (MS) 1316, a compact flash (CF) card 1318, or an embedded storage device 1320 (as shown in FIG. 1C). The embedded storage device 1320 includes an embedded MMC (eMMC). It should be mentioned that the eMMC is directly coupled to the motherboard of the host system.

Figure 2:
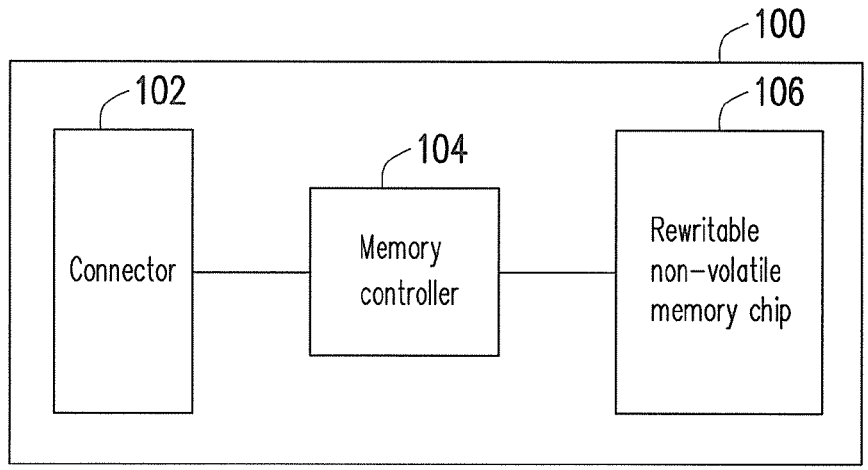
FIG. 2 is a schematic block diagram of the memory storage device in FIG. 1A.

FIG. 2 is a schematic block diagram of the memory storage device 100 in FIG. 1A. Referring to FIG. 2, the memory storage device 100 includes a connector 102, a memory controller 104, and a rewritable non-volatile memory chip 106.

The connector 102 is coupled to the memory controller 104 and configured to couple to the host system 1000. In the present exemplary embodiment, the connector 102 is a universal serial bus (USB) interface. However, the present invention is not limited thereto, and in other exemplary embodiments, the connector 102 may also be a serial advanced technology attachment (SATA) interface, a MMC interface, a parallel advanced technology attachment (PATA) interface, an Institute of Electrical and Electronic Engineers (IEEE) 1394 interface, a peripheral component interconnect (PCI) express interface, a SD interface, a MS interface, a CF interface, an integrated drive electronics (IDE) interface, or any other suitable interface.

The memory controller 104 executes a plurality of logic gates or control instructions implemented in a hardware form or a firmware form and performs various data operations in the rewritable non-volatile memory chip 106 according to commands issued by the host system 1000. In particular, the memory controller 104 controls and manages any access of the memory storage device 100 according to the memory storage device access method provided by the present exemplary embodiment, so as to protect data stored in the memory storage device 100. The memory storage device access method in the present exemplary embodiment will be described below with reference to accompanying drawings.

The rewritable non-volatile memory chip 106 is coupled to the memory controller 104. The rewritable non-volatile memory chip 106 stores file system information (for example, a file allocation table (FAT) or a new technology file system (NTFS)) and general data (for example, text files, video files, or audio files). The rewritable non-volatile memory chip 106 may be a multi level cell (MLC) NAND flash memory chip. However, the present invention is not limited thereto, and the rewritable non-volatile memory chip 106 may also be a single level cell (SLC) NAND flash memory chip, any other flash memory chip, or any memory chip having the same characteristics.

Figure 3:
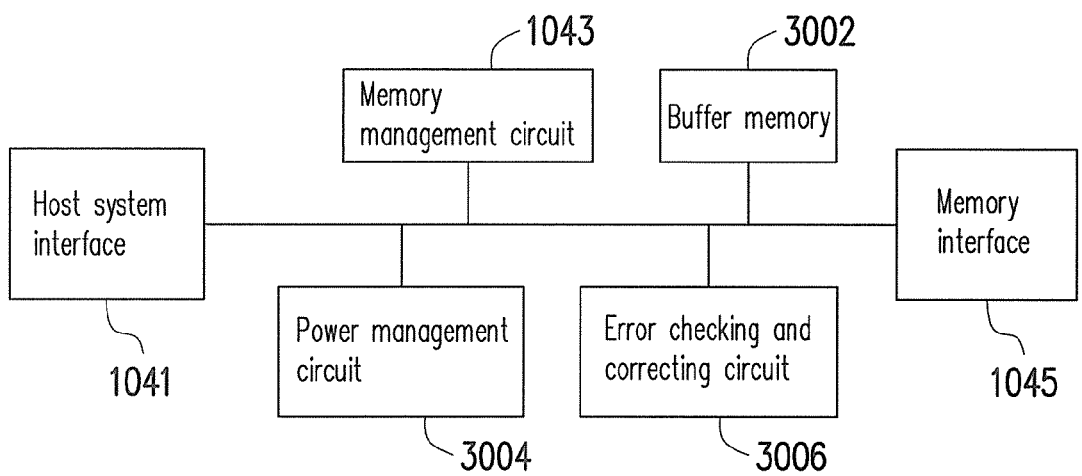
FIG. 3 is a schematic block diagram of a memory controller according to an exemplary embodiment of the present invention.

FIG. 3 is a schematic block diagram of a memory controller according to an exemplary embodiment of the present invention. Referring to FIG. 3, the memory controller 104 includes a host system interface 1041, a memory management circuit 1043, and a memory interface 1045.

The host system interface 1041 is coupled to the memory management circuit 1043 and configured to couple to the host system 1000 through the connector 102. The host system interface 1041 receives and identifies commands and data from the host system 1000. Namely, commands and data transmitted by the host system 1000 are sent to the memory management circuit 1043 through the host system interface 1041. In the present exemplary embodiment, the host system interface 1041 is, corresponding to the connector 102, a USB interface. In other exemplary embodiments, the host system interface 1041 may also be a SATA interface, a MMC interface, a PATA interface, an IEEE 1394 interface, a PCI express interface, a SD interface, a MS interface, a CF interface, an IDE interface, or an interface compatible to any other interface standard.

The memory management circuit 1043 controls the overall operation of the memory controller 104. To be specific, the memory management circuit 1043 has a plurality of control instructions, and when the memory storage device 100 is in operation, the control instructions are executed to accomplish the memory storage device access method in the present exemplary embodiment.

In an exemplary embodiment of the present invention, the control instructions of the memory management circuit 1043 are implemented in a firmware form. For example, the memory management circuit 1043 has a microprocessor unit (not shown) and a read-only memory (ROM, not shown), and the control instructions are burnt in the ROM. When the memory storage device 100 is in operation, the control instructions are executed by the microprocessor unit to accomplish the memory storage device access method in the present exemplary embodiment.

In another exemplary embodiment of the present invention, the control instructions of the memory management circuit 1043 may also be stored in a specific area of the rewritable non-volatile memory chip 106 (for example, a system area exclusively used for storing system data in the rewritable non-volatile memory chip 106) as program codes. In addition, the memory management circuit 1043 has a microprocessor unit (not shown), a ROM (not shown), and a RAM (not shown). The ROM has a driving code, and when the memory controller 104 is enabled, the microprocessor unit first executes the driving code to load the control instructions from the rewritable non-volatile memory chip 106 into the RAM of the memory management circuit 1043. Thereafter, the microprocessor unit runs the control instructions to execute the memory storage device access method in the present exemplary embodiment. Moreover, in yet another exemplary embodiment of the present invention, the control instructions of the memory management circuit 1043 may also be implemented in a hardware form.

The memory interface 1045 is coupled to the memory management circuit 1043 so that the memory controller 104 and the rewritable non-volatile memory chip 106 are coupled with each other. Accordingly, the memory controller 104 can perform related operations on the rewritable non-volatile memory chip 106. Namely, data to be written into the rewritable non-volatile memory chip 106 is converted by the memory interface 1045 into a format acceptable to the rewritable non-volatile memory chip 106.

In an exemplary embodiment of the present invention, the memory controller 104 further includes a buffer memory 3002. The buffer memory 3002 may be a static random access memory (SRAM) or a dynamic random access memory (DRAM). However, the present invention is not limited thereto. The buffer memory 3002 is coupled to the memory management circuit 1043 for temporarily storing data from the host system 1000 or the rewritable non-volatile memory chip 106.

In another exemplary embodiment of the present invention, the memory controller 104 further includes a power management circuit 3004. The power management circuit 3004 is coupled to the memory management circuit 1043 and configured to control the power supply of the memory storage device 100.

In yet another exemplary embodiment of the present invention, the memory controller 104 further includes an error checking and correcting (ECC) circuit 3006. The ECC circuit 3006 is coupled to the memory management circuit 1043 and configured to execute an ECC procedure to ensure data accuracy. To be specific, when the memory management circuit 1043 receives a write command from the host system 1000, the ECC circuit 3006 generates a corresponding ECC code for the data corresponding to the write command, and the memory management circuit 1043 writes the data corresponding to the write command and the corresponding ECC code into the rewritable non-volatile memory chip 106. Subsequently, when the memory management circuit 1043 reads the data from the rewritable non-volatile memory chip 106, it also reads the ECC code corresponding to the data, and ECC circuit 3006 executes the ECC procedure on the data according to the ECC code.

Figure 4:
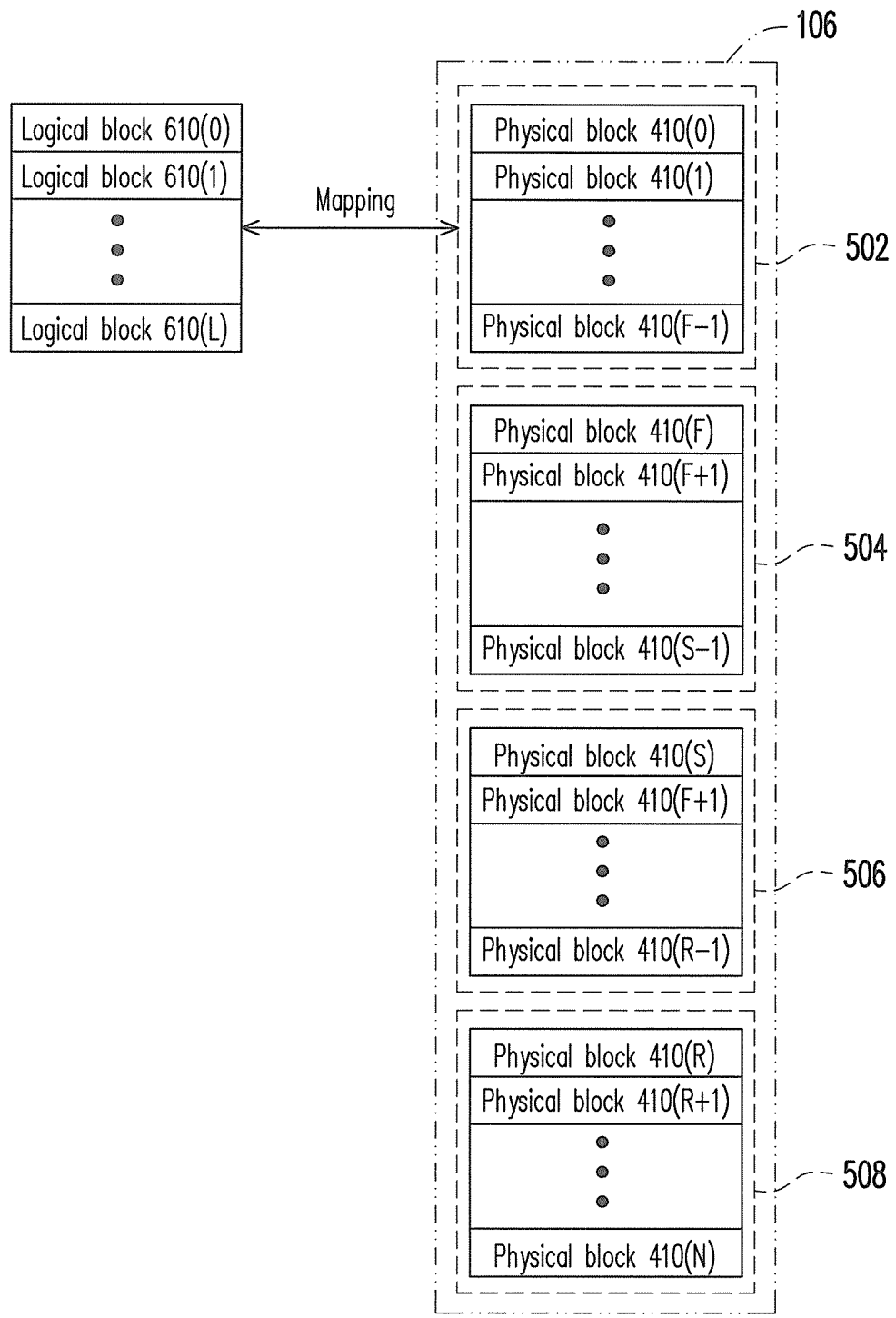
FIG. 4 is a diagram illustrating how physical blocks are managed according to an exemplary embodiment of the present invention.

FIG. 4 is a diagram illustrating how physical blocks are managed according to an exemplary embodiment of the present invention.

Referring to FIG. 4, the rewritable non-volatile memory chip 106 in the present exemplary embodiment includes physical blocks 410(0)-410(N), and each of the physical blocks includes a plurality of physical pages. The memory management circuit 1043 in the memory controller 104 logically groups the physical blocks 410(0)-410(N) into a data area 502, a spare area 504, a system area 506, and a replacement area 508. The symbols F, S, R, and N in FIG. 4 are positive integers and respectively represent the numbers of physical blocks in foregoing areas. These numbers can be determined by the manufacturer of the memory storage device 100 according to the capacity of the rewritable non-volatile memory chip 106.

Physical blocks logically belonging to the data area 502 and the spare area 504 are used for storing data from the host system 1000. To be specific, the physical blocks in the data area 502 are considered physical blocks containing data, while the physical blocks in the spare area 504 are used for substituting the physical blocks in the data area 502. In other words, the physical blocks in the spare area 504 are either blank or usable physical blocks (no data is recorded therein or data recorded therein is already marked as invalid data). When a write command and the data to be written are received from the host system 1000, the memory management circuit 1043 selects a physical block from the spare area 504 and writes the data into the selected physical block, so as to substitute a physical block in the data area 502.

Physical blocks logically belonging to the system area 506 are used for recording system data, such as the manufacturer and model of the rewritable non-volatile memory chip 106.

Physical blocks logically belonging to the replacement area 508 are used for replacing damaged physical blocks in the data area 502, the spare area 504, and the system area 506. To be specific, if there are still normal physical blocks in the replacement area 508 and a physical block in the data area 502 is damaged, the memory management circuit 1043 selects a normal physical block from the replacement area 508 to replace the damaged physical block in the data area 502.

In order to allow the host system 1000 to access the rewritable non-volatile memory chip 106, the memory management circuit 1043 configures a plurality of logical blocks 610(0)-610(L) to be mapped to the physical blocks 410(0)-410(F-1) in the data area 502. Each of the logical blocks includes a plurality of logical pages, and the logical pages in the logical blocks 610(0)-610(L) are sequentially mapped to the physical pages in the physical blocks 410(0)-410(F-1).

To be specific, the memory management circuit 1043 provides the configured logical blocks 610(0)-610(L) to the host system 1000 and maintains a logical block-physical block mapping table to record the mapping relationship between the logical blocks 610(0)-610(L) and the physical blocks 410(0)-410(F-1). When the host system 1000 is about to access a logical access address, the memory management circuit 1043 converts the logical access address into a logical page of a corresponding logical block and then accesses the corresponding physical page according to the logical block-physical block mapping table.

Figure 5:
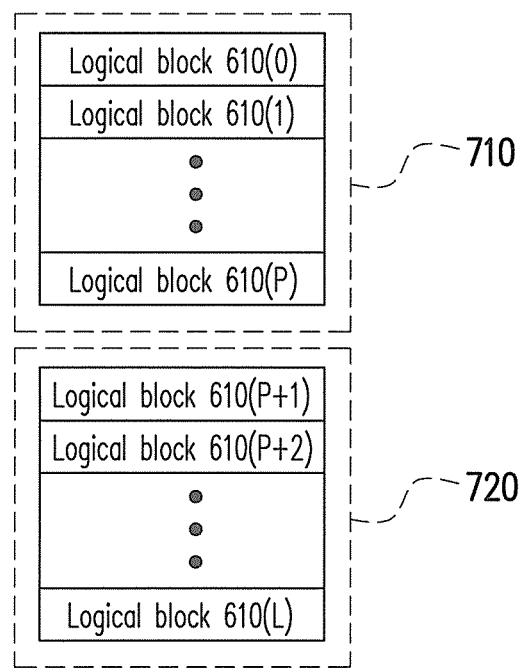
FIG. 5 is a diagram illustrating the configuration of logical blocks according to an exemplary embodiment of the present invention.

FIG. 5 is a diagram illustrating the configuration of logical blocks according to an exemplary embodiment of the present invention. Referring to FIG. 5, the memory management circuit 1043 divides the logical blocks 610(0)-610(L) into a first partition 710 (including the logical blocks 610(0)-610(P)) and a second partition 720 (including the logical blocks 610(P+1)-610(L)), wherein the first partition 710 records an auto-execute file which is burnt when the memory storage device 100 is manufactured. The second partition 720 (also referred to as a storage area) is a hidden partition and can only be accessed after a password authentication is passed. It should be noted that the number of partitions is not limited in the present invention, and in other exemplary embodiments, the memory management circuit 1043 may also divide the logical blocks 610(0)-610(L) into three or more partitions.

In the present exemplary embodiment, when the memory storage device 100 is coupled to the host system 1000, the host system 1000 cannot access data stored in the memory storage device 100, and whether the host system 1000 can access data in the memory storage device 100 is determined by the memory management circuit 1043 according to the existence of a trigger signal. Herein the trigger signal is generated through the interaction between a portable object (for example, a proximity card, an electronic key, or a non-electronic key) and the memory storage device 100, and the interaction includes contact interaction (for example, electrical connection) or non-contact interaction (for example, magnetic induction).

Below, how the memory management circuit 1043 controls and manages access of the memory storage device 100 will be explained with reference to FIGS. 6A-6C. In the present exemplary embodiment, the memory storage device 100 includes a card reader 810 coupled to the memory management circuit 1043, and the trigger signal is generated when an authorized identification card is inserted into the card reader 810. The authorized identification card may be a smart card or a SD card. However, the type of the authorized identification card is not limited herein. To be specific, once the card reader 810 detects a card, it issues a signal to notify the memory management circuit 1043, and the memory management circuit 1043 then determines whether the inserted card is an authorized identification card.

Figure 6A:
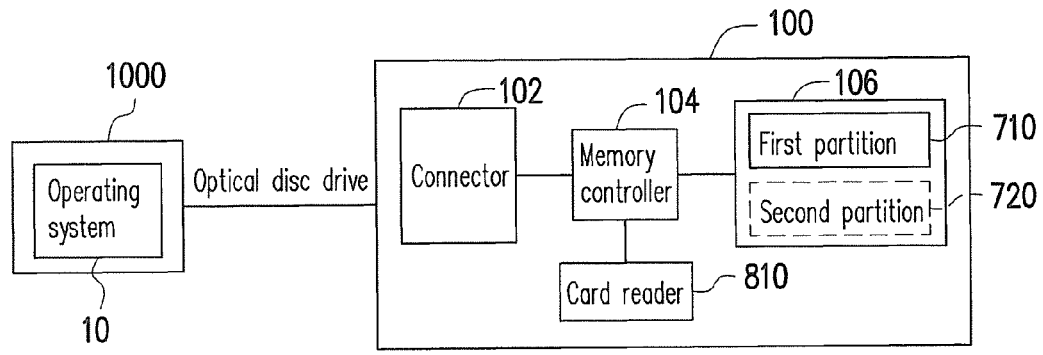
FIGS. 6A-6C are diagrams illustrating how a memory storage device is accessed according to an exemplary embodiment of the present invention.

Referring to FIG. 6A, in the present exemplary embodiment, the memory management circuit 1043 simulates a CD partition by using the first partition 710. Thus, after the memory storage device 100 is coupled to the host system 1000 through the connector 102 and when the host system 1000 inquires about the device characteristic of the memory storage device 100, the memory management circuit 1043 announces that the memory storage device 100 is an optical disc drive (for example, a compact disc (CD) ROM, a digital video disc (DVD) ROM, a blue-ray disc (BD) ROM), and the OS 10 of the host system 1000 configures a mount point to mount the optical disc drive. Accordingly, the memory management circuit 1043 can receive commands from the host system 1000 via the mount point. For example, the OS 10 issues media check commands at fixed intervals via the mount point to inquire whether there is any medium (e.g., optical disc) in the optical disc drive. Herein because the card reader 810 has not detected any authorized identification card, it does not generate any trigger signal. Accordingly, the memory management circuit 1043 sends a media not ready message back to the host system 1000. To be specific, at this point, the host system 1000 is not able to identify the second partition 720 and considers the memory storage device 100 as an optical disc drive with no medium.

Figure 6B:
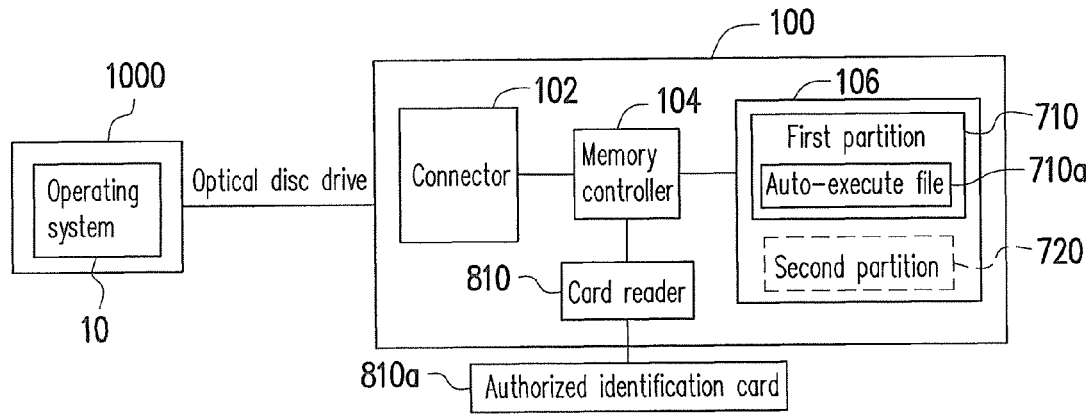

Thereafter, referring to FIG. 6B, if an authorized identification card 810a is inserted into the card reader 810, the memory management circuit 1043 determines that the trigger signal is existent. Thus, after receiving a media check command from the host system 1000, the memory management circuit 1043 sends a ready message (for example, a media ready message) back to the host system 1000. Next, the OS 10 in the host system 1000 automatically runs an auto-execute file 710a recorded in the first partition 710. In the present exemplary embodiment, the auto-execute file 710a is a script file (for example, a script file "autorun.inf") which can be automatically ran by the OS 10 and records a specific application program to be automatically executed. After the OS 10 automatically run the auto-execute file 710a, the specific application program is executed in the host system 1000 and requires a user to input a password. The host system 1000 sends the password input by the user to the memory storage device 100. Below, the password input by the user through the host system 1000 is referred to as a first password. The host system 1000 may first encrypt the first password by using an encryption algorithm (for example, the RSA encryption algorithm) and then send the encrypted password to the memory storage device 100.

Since herein the first password has not yet pass the authentication of the memory storage device 100, the host system 1000 cannot identify the second partition 720 yet. The memory management circuit 1043 needs to determine whether to provide the second partition 720 to the host system 1000 according to the first password after it obtains the encrypted password from the host system 1000 and restores the original first password. To be specific, the memory management circuit 1043 carries out an authentication procedure according to the first password and another one or more passwords received from the memory storage device 100, so as to determine whether to provide the second partition 720 to the host system 1000.

For example, in the present exemplary embodiment, the authorized identification card 810a records a second password, and the second partition 720 records a third password. The memory management circuit 1043 respectively obtains the second password and the third password from the authorized identification card 810a and the second partition 720. Herein the second password and the third password are also encrypted when they are transmitted to the memory management circuit 1043. The memory management circuit 1043 first decrypts the second password and the third password and then determines whether the first password, the second password, and the third password pass the authentication procedure. For example, the memory management circuit 1043 performs an exclusive-OR (XOR) calculation on the first password and the second password and determines whether the calculation result matches the third password. If the calculation result matches the third password, the memory management circuit 1043 determines that the authentication procedure is passed and provides the logical blocks 610(P+1)-610(L) in the second partition 720 to the host system 1000. If the authentication procedure is not passed, the second partition 720 is kept in the hidden state. In another exemplary embodiment, the memory management circuit 1043 can determine whether to provide the second partition 720 to the host system 1000 according to whether the first password and the second password in the authorized identification card 810a pass the authentication procedure or whether the first password and the third password in the second partition 720 pass the authentication procedure, and the unused password can be omitted. It should be noted that the authentication procedure is not limited in the present invention, and in other exemplary embodiments, whether the first password input by the user matches the second password and/or the third password from the memory storage device 100 may also be verified through other techniques.

Figure 6C:
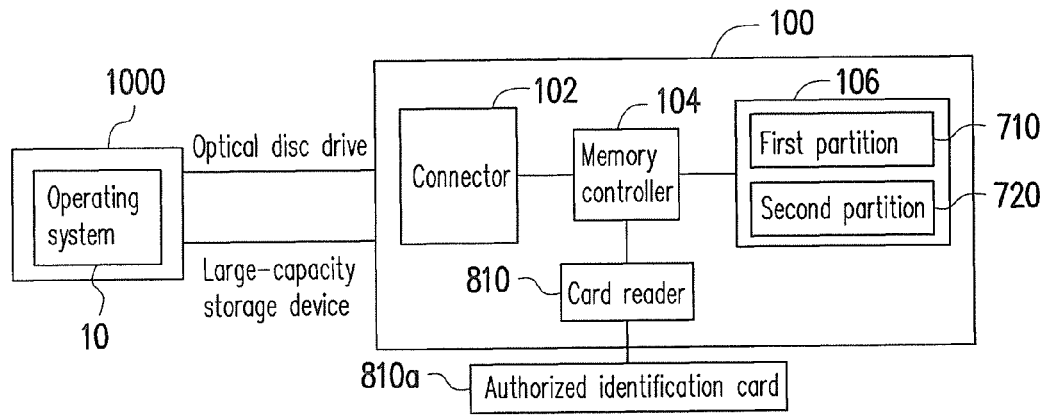

If the authentication procedure is passed, as shown in FIG. 6C, the memory management circuit 1043 announces to the host system 1000 that the memory storage device 100 is a device including an optical disc drive and a large-capacity storage device. Accordingly, the OS 10 configures two mount points, and besides mounting the first partition 710 corresponding to the optical disc drive to one of the mount points, the OS 10 also mounts the second partition 720 corresponding to the large-capacity storage device to the other mount point, so that the host system 1000 can both read data from the second partition 720 and write data into the second partition 720.

However, the trigger signal is not existent once the authorized identification card 810a is taken out of the card reader 810. In this case, the memory management circuit 1043 does not provide the logical blocks 610(P+1)-610(L) in the second partition 720 to the host system 1000 anymore. After receiving a media check command from the host system 1000, the memory management circuit 1043 sends a media not ready message back to the host system 1000. In other words, the host system 1000 identifies the memory storage device 100 as an optical disc drive (as shown in FIG. 6A) containing no medium once again.

In another exemplary embodiment, the memory management circuit 1043 does not simulate a CD partition by using the first partition 710 in advance. Thus, when the memory storage device 100 is coupled to the host system 1000 through the connector 102, the host system 1000 cannot recognize the type of the memory storage device 100.

In this case, if an authorized identification card is inserted into the card reader and accordingly a trigger signal is generated, the memory management circuit 1043 determines that the trigger signal is existent and controls the memory storage device 100 to simulate a power off and reconnection behaviour. Namely, the memory management circuit 1043 issues a specific instruction to instruct the host system interface 1041 and the data transmission interface 1110 to disconnect (i.e., control the connector 102 and the host system 1000 to enter an uncoupled state) and connect again (i.e., control the connector 102 and the host system 1000 to enter a coupled state), so as to allow the host system 1000 to re-inquire identification information of the memory storage device 100. Herein the memory management circuit 1043 simulates a CD partition by using the first partition 710 and announces to the host system 1000 that the memory storage device 100 is an optical disc drive. While receiving a media check command from the host system 1000, the memory management circuit 1043 sends a media ready message back to the host system 1000 such that the OS 10 of the host system 1000 automatically runs the auto-execute file stored in the first partition 710 and requires the user to input a password (i.e., the first password).

After receiving the first password input by the user through the host system 1000, the memory management circuit 1043 carries out the authentication procedure in a way similar to that described in foregoing exemplary embodiment. Namely, the memory management circuit 1043 determines whether the first password, the second password obtained from the authorized identification card, and the third password obtained from the second partition 720 pass the authentication procedure, and when it determines that the first password, the second password, and the third password pass the authentication procedure, the memory management circuit 1043 provides the logical blocks 610(P+1)-610(L) in the second partition 720 to the host system 1000. In another exemplary embodiment, the memory management circuit 1043 may also determine whether to provide the logical blocks 610(P+1)-610(L) to the host system 1000 according to whether the first password and the second password obtained from the authorized identification card or the first password and the third password obtained from the second partition 720 passes the authentication procedure after it receives the first password input by the user through the host system 1000. Namely, in the present exemplary embodiment, only the first password and the second password or the first password and the third password are used in the authentication procedure, and the unused password can be omitted. A symmetric algorithm or any other algorithm can be used in the authentication procedure.

Similarly, once the authorized identification card is taken out of the card reader (i.e., the trigger signal is non-existent), the memory management circuit 1043 does not allow the host system 1000 to access the second partition 720 anymore.

In the exemplary embodiment described above, an authorized identification card is inserted into a card reader to trigger the host system 1000 to automatically run an auto-execute file in the memory storage device 100, so as to request a user to input a password and determine whether to provide the hidden second partition 720 to the host system 1000 according to the password. In other words, the user has to insert the authorized identification card into the card reader before he/she can input the password. Such a mechanism makes unlocking the memory storage device 100 more difficult and accordingly enhances the security of data stored therein. Besides, in the exemplary embodiment described above, the operation of taking the authorized identification card out of the card reader automatically converts the memory storage device 100 into a locked state in which the memory storage device 100 is not accessible to the host system 1000. Thus, the user can lock the memory storage device 100 by simply unplugging the authorized identification card from the card reader, which makes data protection very simply and convenient.

Even though the trigger signal is generated when an authorized identification card is inserted into a card reader in the exemplary embodiment described above, the generation of the trigger signal is not limited in the present invention. For example, in other exemplary embodiments, the memory storage device 100 includes a switch module coupled to the memory management circuit 1043, and the memory storage device 100 has an input component on its casing, wherein the input component can be coupled to the switch module to change the state of the switch module. Herein the input component may be a button, a key, a knob, a rocker switch, or a DIP switch, etc. When the switch module enters a specific state due to an operation performed on the input component, a trigger signal is generated so that the OS 10 of the host system 1000 automatically runs the auto-execute file in the first partition 710 to request a user to input a password. The memory management circuit 1043 determines whether to provide the second partition 720 in the rewritable non-volatile memory chip 106 to the host system 1000 through a mechanism similar to that described in foregoing exemplary embodiment.

Figure 7:
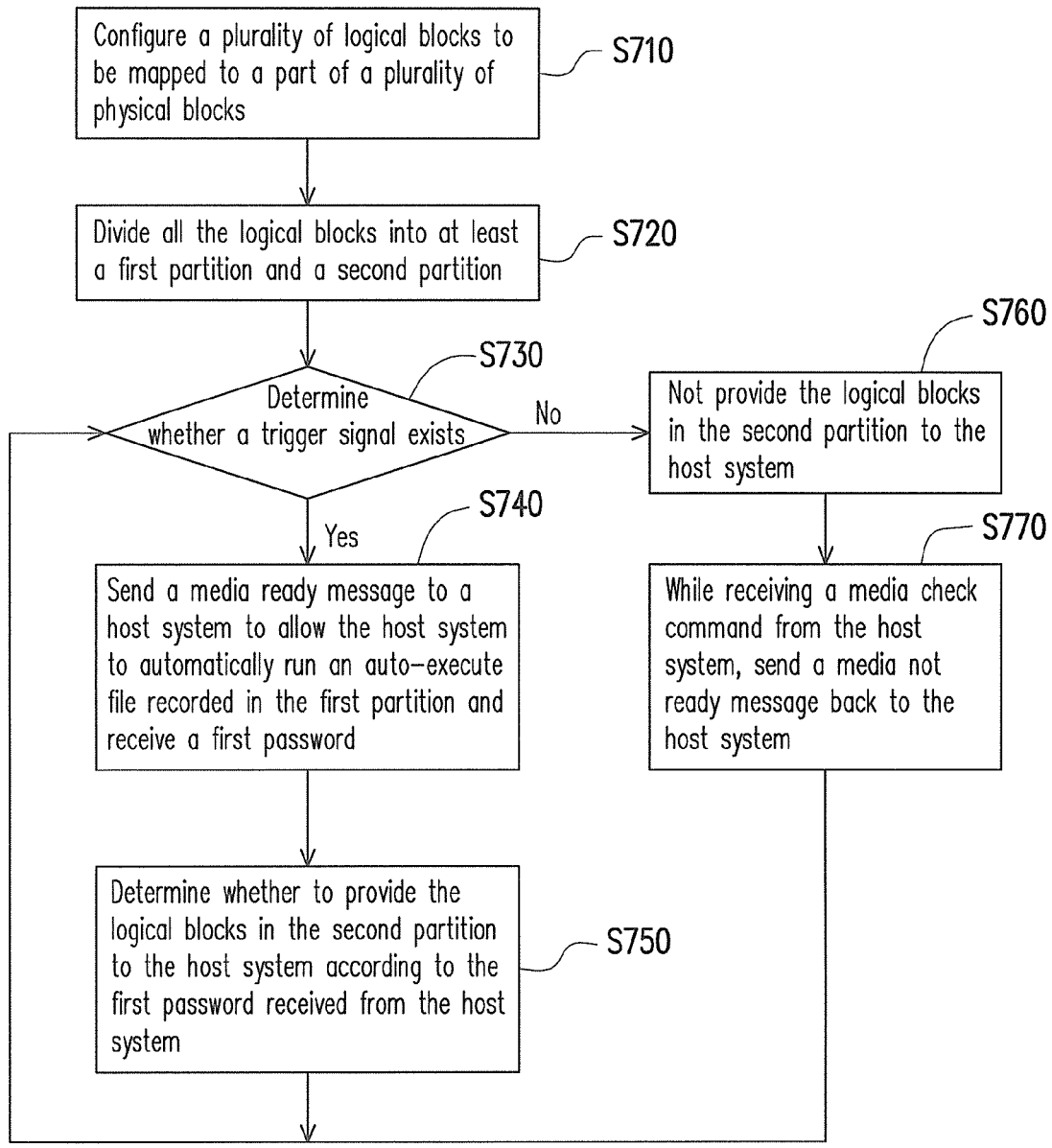
FIG. 7 is a flowchart of an access method of a memory storage device according to an exemplary embodiment of the present invention.

FIG. 7 is a flowchart of an access method of a memory storage device according to an exemplary embodiment of the present invention.

Referring to FIG. 7, first, in step S710, the memory management circuit 1043 in the memory storage device 100 configures the logical blocks 610(0)-610(L) to be mapped to the physical blocks 410(0)-410(F−1) in the rewritable non-volatile memory chip 106. In step S720, the memory management circuit 1043 divides all the logical blocks 610(0)-610(L) into a first partition 710 and a second partition 720, wherein the first partition 710 records an auto-execute file.

Then, in step S730, the memory management circuit 1043 determines whether a trigger signal exists. For example, if the memory storage device 100 has a card reader, the trigger signal is then generated when an authorized identification card is inserted into the card reader. If the memory storage device 100 has a switch module, the trigger signal is then generated when the switch module is in a specific state.

If the trigger signal exists, in step S740, the memory management circuit 1043 sends a media ready message to the host system 1000 when the host system 1000 issues a media check command, so that the host system 1000 automatically runs an auto-execute file recorded in the first partition 710 and receives a first password input by a user through the host system 1000.

Next, in step S750, the memory management circuit 1043 determines whether to provide the logical blocks 610(P+1)-610(L) in the second partition 720 to the host system 1000 according to the first password received from the host system 1000. The method of determining whether to provide the logical blocks 610(P+1)-610(L) in the second partition 720 to the host system 1000 according to the first password received from the host system 1000 has been explained in foregoing exemplary embodiments therefore will not be described herein.

If the trigger signal does not exist, in step S760, the memory management circuit 1043 does not provide the logical blocks 610(P+1)-610(L) in the second partition 720 to the host system 1000. Besides, in step S770, while receiving the media check command from the host system 1000, the memory management circuit 1043 sends a media not ready message back to the host system 1000.

When the memory storage device 100 is coupled to the host system 1000, steps S730-S770 in the memory storage device access method provided by the present exemplary embodiment are repeatedly executed in order to prohibit the host system 1000 from accessing the memory storage device 100 when the trigger signal is non-existent and determine whether to allow the host system 1000 to access the memory storage device 100 according to the password input by the user when the trigger signal is existent.

In summary, the present invention provides a memory storage device and a memory controller and an access method thereof, wherein a trigger signal is generated by inserting an authorized identification card or adjusting the state of a switch module, and a user is allowed to input his/her password through a host system only when the trigger signal exists. Thereby, access of the memory storage device can be controlled and managed through a convenient and highly secure technique. However, the advantages aforementioned not required in all versions of the present invention.

It will be apparent to those skilled in the art that various modifications and variations can be made to the structure of the present invention without departing from the scope or spirit of the present invention. In view of the foregoing, it is intended that the present invention cover modifications and variations of this invention provided they fall within the scope of the following claims and their equivalents.

What is claimed is:

1. A method of accessing a memory storage device, wherein the memory storage device has a rewritable non-volatile memory chip, and the rewritable non-volatile memory chip has a plurality of physical blocks, the method comprising:
   configuring a plurality of logical blocks to be mapped to a part of the physical blocks;
   dividing the logical blocks into at least a first partition and a second partition, wherein the first partition records an auto-execute file;
   determining whether a trigger signal is existent, wherein the trigger signal is generated through interaction between a portable object and the memory storage device;
   in response to determining that the trigger signal is existent, sending a media ready message to a host system to allow the host system to automatically run the auto-execute file and receive a first password;
   determining whether to provide the logical blocks in the second partition to the host system according to the first password received from the host system; and
   in response to determining that the trigger signal is not existent and receiving a media check command from the host system, not providing the logical blocks in the second partition to the host system and sending a media not ready message to the host system,
   wherein the step of sending the media ready message to the host system comprises:
      controlling the memory storage device to simulate a power off and reconnection behavior;
      simulating a compact disc (CD) partition by using the first partition; and
      sending, the media ready message to the host system when the media check command is received from the host system.

2. The method according to claim 1, wherein the memory storage device comprises a card reader, and the trigger signal is generated when an authorized identification card is inserted into the card reader.

3. The method according to claim 2, wherein the authorized identification card records a second password, the second partition records a third password, and the step of determining whether to provide the logical blocks in the second partition to the host system according to the first password received from the host system comprises:
   obtaining the second password and the third password;
   determining whether the first password, the second password, and the third password pass an authentication procedure; and
   when the first password, the second password, and the third password pass the authentication procedure, providing the logical blocks in the second partition to the host system.

4. A memory controller, for managing a rewritable non-volatile memory chip in a memory storage device, the memory controller comprising:
   a host system interface, configured to couple to a host system;
   a memory interface, configured to couple to the rewritable non-volatile memory chip, wherein the rewritable non-volatile memory chip has a plurality of physical blocks; and
   a memory management circuit, coupled to the host system interface and the memory interface, wherein the memory management circuit configures a plurality of logical blocks to be mapped to a part of the physical blocks and divides the logical blocks into at least a first partition and a second partition, wherein the first partition records an auto-execute file,
   the memory management circuit also determines whether a trigger signal is existent, wherein the trigger signal is generated through interaction between a portable object and the memory storage device,
   the memory management circuit sends a media ready message to the host system to allow the host system to automatically run the auto-execute file and receive a first password in response to determining that the trigger signal is existent,
   the memory management circuit further determines whether to provide the logical blocks in the second partition to the host system according to the first password received from the host system,
   the memory management circuit does not provide the logical blocks in the second partition to the host system and sends a media not ready message to the host system in response to determining that the trigger signal is not existent and receiving a media check command from the host system,
   wherein in the operation of sending the media ready message to the host system, the memory management circuit controls the memory storage device to simulate a power off and reconnection behavior and simulates a CD partition by using the first partition, and when the media check command is received from the host system, the memory management circuit sends the media ready message to the host system.

5. The memory controller according to claim 4, wherein the memory storage device comprises a card reader, and the trigger signal is generated when an authorized identification card is inserted into the card reader.

6. The memory controller according to claim 5, wherein the authorized identification card records a second password, the second partition records a third password, the memory management circuit obtains the second password and the third password and determines whether the first password, the second password, and the third password pass an authentication procedure, and when the first password, the second password, and the third password pass the authentication procedure, the memory management circuit provides the logical blocks in the second partition to the host system.

7. A memory storage device, comprising:
   a rewritable non-volatile memory chip, having a plurality of physical blocks;
   a connector, configured to couple to a host system; and
   a memory controller, coupled to the rewritable non-volatile memory chip and the connector, wherein the memory controller configures a plurality of logical blocks to be mapped to a part of the physical blocks and divides the logical blocks into at least a first partition and a second partition, wherein the first partition records an auto-execute file, the memory controller also determines whether a trigger signal is existent, wherein the trigger signal is generated through interaction between a portable object and the memory storage device, the memory controller sends a media ready message to the host system to allow the host system to automatically run the auto-execute file and receive a first password in response to determining that the trigger signal is existent, the memory controller further determines whether to provide the logical blocks in the second partition to the host system according to the first password received from the host system, the memory controller does not provide the logical blocks in the second partition to the host system and sends a media not ready message to the host system in response to determining that the trigger signal is not existent and receiving a media check command from the host system, wherein in the operation of sending the media ready message to the host system, the memory controller controls the memory storage device to simulate a power off and reconnection behavior and simulates a CD partition by using the first partition, and when the media check command is received from the host system, the memory controller sends the media ready message to the host system.

8. The memory storage device according to claim 7, further comprising:

a card reader, coupled to the memory controller, wherein the trigger signal is generated when an authorized identification card is inserted into the card reader.

9. The memory storage device according to claim 8, wherein the authorized identification card records a second password, the second partition records a third password, the memory controller obtains the second password and the third password and determines whether the first password, the second password, and the third password pass an authentication procedure, and when the first password, the second password, and the third password pass the authentication procedure, the memory controller provides the logical blocks in the second partition to the host system.

10. A method of accessing a pluggable memory storage device, wherein the pluggable memory storage device has a storage area and is suitable for being coupled to a host system, the method comprising:

determining whether a trigger signal is existent by using the pluggable memory storage device, wherein the trigger signal is generated through interaction between a portable object and the pluggable memory storage device;

in response to determining that the trigger signal is existent, sending a ready message to the host system to allow the host system to use a first password;

determining whether to provide the storage area to the host system according to the first password received from the host system and at least one second password received from the pluggable memory storage device; and in response to determining that the trigger signal is not existent and receiving a media check command from the host system, not providing a plurality of logical blocks in the storage area to the host system and sending a media not ready message to the host system, wherein the step of sending the ready message to the host system comprises:

controlling the pluggable memory storage device to simulate a power off and reconnection behavior;

simulating a CD partition; and sending the media ready message to the host system when the media check command is received from the host system.

* * * * *